United States Patent
Feldman et al.

(10) Patent No.: US 9,438,279 B2
(45) Date of Patent: Sep. 6, 2016

(54) WIRELESS DEVICE WITH ADAPTIVELY-TUNABLE ELECTRICALLY-SMALL ANTENNAS

(71) Applicant: ALTAIR SEMICONDUCTOR LTD., Hod Hasharon (IL)

(72) Inventors: Dima Feldman, Ramat Hasharon (IL); Yigal Bitran, Ramat Hasharon (IL)

(73) Assignee: ALTAIR SEMICONDUCTOR LTD., Hod Hasharon (IL)

( * ) Notice: Subject to any disclaimer, the term of this patent is extended or adjusted under 35 U.S.C. 154(b) by 0 days.

(21) Appl. No.: 14/708,255

(22) Filed: May 10, 2015

(65) Prior Publication Data
US 2015/0326254 A1    Nov. 12, 2015

Related U.S. Application Data

(63) Continuation of application No. PCT/IB2015/053341, filed on May 7, 2015.

(60) Provisional application No. 61/991,628, filed on May 12, 2014.

(51) Int. Cl.
| H04B 1/02 | (2006.01) |
| H04B 1/04 | (2006.01) |
| H04B 1/00 | (2006.01) |
| H04B 1/3827 | (2015.01) |
| H04B 1/10 | (2006.01) |

(52) U.S. Cl.
CPC ............ *H04B 1/0458* (2013.01); *H04B 1/006* (2013.01); *H04B 1/1009* (2013.01); *H04B 1/3827* (2013.01)

(58) Field of Classification Search
CPC ..... H04B 1/0064; H04B 1/0458; H04B 7/08
USPC ........... 455/73, 562.1, 101, 130, 132, 150.1, 455/168.1, 193.1, 269, 272, 277.1
See application file for complete search history.

(56) References Cited

U.S. PATENT DOCUMENTS 5,483,688 A    1/1996  English et al.
8,320,850 B1 *  11/2012  Khlat ..................... H03H 7/40
                                                  455/107

(Continued)

FOREIGN PATENT DOCUMENTS

CN         102752007 A       10/2012

OTHER PUBLICATIONS

Wheeler, H., "Fundamental Limits of Small Antennas," Proceedings of the I.R.E. (IEEE), vol. 35, pp. 1479-1484, Dec. 1947.

(Continued)

*Primary Examiner* — Tuan Pham
(74) *Attorney, Agent, or Firm* — D. Kligler IP Services Ltd.

(57) ABSTRACT

A communication device includes a transmitter (TX), a receiver (RX), one or more adaptively-tunable Electrically-Small Antennas (ESAs), and a control unit. The transmitter is configured to produce a TX signal for transmission on a TX frequency band. The receiver is configured to process an RX signal received on an RX frequency band. The adaptively-tunable ESAs are configured to transmit the TX signal on the TX frequency band and to receive the RX signal on the RX frequency band. The control unit is configured to adaptively tune respective responses of the one or more ESAs in the TX or RX frequency band.

18 Claims, 2 Drawing Sheets

(56) References Cited

U.S. PATENT DOCUMENTS

| | | |
|---|---|---|
| 2006/0098723 A1 | 5/2006 | Toncich et al. |
| 2010/0302123 A1 | 12/2010 | Knudsen et al. |
| 2011/0086600 A1 | 4/2011 | Muhammad |
| 2011/0256841 A1 | 10/2011 | Kakuya et al. |
| 2012/0169565 A1 | 7/2012 | Morris, III |
| 2012/0293384 A1* | 11/2012 | Knudsen ............ H01Q 1/241 343/745 |
| 2012/0295554 A1* | 11/2012 | Greene ............ H04B 1/0458 455/77 |
| 2012/0295555 A1 | 11/2012 | Greene et al. |
| 2013/0225088 A1 | 8/2013 | Anderson |
| 2014/0028521 A1 | 1/2014 | Bauder et al. |
| 2014/0140455 A1* | 5/2014 | Mirzaei ............ H04B 1/006 375/350 |

OTHER PUBLICATIONS

Wheeler, H., "The Radiansphere Around a Small Antenna," Proceedings of the I.R.E. (IEEE), vol. 47, pp. 1325-1331, Aug. 1959.

Mclean, J., "A Re-Examination of the Fundamental Limits on the Radiation Q of Electrically Small Antennas," IEEE Transactions on Antennas and Propagation, vol. 44, No. 5, pp. 672-675, May 1996.

International Application # PCT/IB2015/053341 Search Report dated Sep. 3, 2015.

Feldman et al., U.S. Appl. No. 14/873,222, filed Oct. 2, 2015.

International Application # PCT/IB2015/057545 Search Report dated Jan. 25, 2016.

* cited by examiner

WIRELESS DEVICE WITH ADAPTIVELY-TUNABLE ELECTRICALLY-SMALL ANTENNAS

CROSS-REFERENCE TO RELATED APPLICATIONS

This application claims the benefit of U.S. Provisional Patent Application 61/991,628, filed May 12, 2014, whose disclosure is incorporated herein by reference.

FIELD OF THE INVENTION

The present invention relates generally to wireless communication, and particularly to wireless communication devices with tunable antennas.

BACKGROUND OF THE INVENTION

Many wireless devices are constrained to a small volume, and therefore use Electrically-Small Antennas (ESAs). An ESA has physical dimensions that are small relative to the free-space wavelength $\lambda$. One example definition regards an antenna as electrically small if it is able to fit in a sphere of radius $\lambda/2\pi$.

Electrically-Small Antennas are described, for example, by Wheeler, in "Fundamental Limitations of Small Antennas," Proceedings of The IRE, volume 35, issue 12, December, 1947, pages 1479-1484; by Wheeler, in "The Radiansphere Around a Small Antenna," Proceedings of The IRE, volume 47, issue 8, August, 1959, pages 1325-1331; and by McLean, in "A Re-Examination of the Fundamental Limits on The Radiation Q of Electrically Small Antennas," IEEE Transactions on Antennas and Propagation, volume 44, issue 5, May, 1996, pages 672-675, which are all incorporated herein by reference.

SUMMARY OF THE INVENTION

An embodiment of the present invention that is described herein provides a communication device including a transmitter (TX), a receiver (RX), one or more adaptively-tunable Electrically-Small Antennas (ESAs), and a control unit. The transmitter is configured to produce a TX signal for transmission on a TX frequency band. The receiver is configured to process an RX signal received on an RX frequency band. The adaptively-tunable ESAs are configured to transmit the TX signal on the TX frequency band and to receive the RX signal on the RX frequency band. The control unit is configured to adaptively tune respective responses of the one or more ESAs in the TX or RX frequency band.

In some embodiments, the control unit is configured to tune at least one of the adaptively-tunable ESAs to a narrowband response. In other embodiments, at least one of the adaptively-tunable ESAs has an instantaneous bandwidth that corresponds to the instantaneous bandwidth of the RX or TX signal. In an embodiment, the control unit is configured to tune at least one of the adaptively-tunable ESAs to match an actual frequency of the RX or TX signal.

In another embodiment, the control unit is configured to tune at least one of the adaptively-tunable ESAs so as to balance a performance of the at least one of the adaptively-tunable ESAs over the RX and TX bands. In yet another embodiment, the TX and RX are configured to transmit the TX signals and receive the RX signals in alternating TX and RX time periods, and the control unit is configured to tune a center frequency of at least one of the adaptively-tunable ESAs to a RX frequency during the RX time periods, and to a TX frequency in the TX frequency band during the TX time periods.

In some embodiments, one of the adaptively-tunable ESAs includes a Transmit/Receive (TX/RX) ESA that is configured both to transmit the TX signal on the TX frequency band and to receive the RX signal on the RX frequency band, and the control unit is configured to adaptively tune the TX/TX ESA to the TX frequency band, both while transmitting on the TX band and while receiving on the RX band. In an example embodiment, another of the adaptively-tunable ESAs includes a Receive-only (RX) ESA that is configured to receive the RX signal on the RX frequency band, and the receiver is configured to apply diversity reception to the RX signal received by the TX/RX and RX-only ESAs. In applying the diversity reception, the receiver may be configured to utilize the RX ESA as a primary antenna, and the TX/RX ESA as a secondary antenna.

In an embodiment, at least one of the adaptively-tunable ESAs includes an impedance matching network, and the control unit is configured to adaptively tune the one of the adaptively-tunable ESAs by adjusting the impedance matching network. In an embodiment, at least one of the adaptively-tunable ESAs includes an aperture-tuning element, and the control unit is configured to adaptively tune the one of the adaptively-tunable ESAs by adjusting the aperture-tuning element. Additionally or alternatively, the control unit may be configured to adaptively tune at least one of the adaptively-tunable ESAs by adaptively connecting or disconnecting one or more elements of the one of the adaptively-tunable ESAs.

In some embodiments, the control unit is configured to adaptively tune at least one of the adaptively-tunable ESAs based on at least one metric selected from a group of metrics consisting of: a Voltage Standing Wave Ratio (VSWR) of the one of the adaptively-tunable ESAs; a property of the RX signal; a property of the TX signal; and an indication from a detector or sensor in the device.

In an embodiment, the TX frequency band is different from the RX frequency band, and the TX and RX are configured to transmit the TX signals and receive the RX signals using Frequency-Division Duplex (FDD) or Half-duplex FDD (HFDD). In another embodiment, the TX frequency band coincides with the RX frequency band, and wherein the TX and RX are configured to transmit the TX signals and receive the RX signals using Time-Division Duplex (TDD).

There is additionally provided, in accordance with an embodiment of the present invention, a method for communication including transmitting a transmit (TX) signal on a TX frequency band, and receiving a receive (RX) signal on an RX frequency band. Respective responses of one or more adaptively-tunable Electrically-Small Antennas (ESAs) are adaptively tuned in the TX or RX frequency band.

The present invention will be more fully understood from the following detailed description of the embodiments thereof, taken together with the drawings in which:

DETAILED DESCRIPTION OF EMBODIMENTS

Overview

Figure 1:
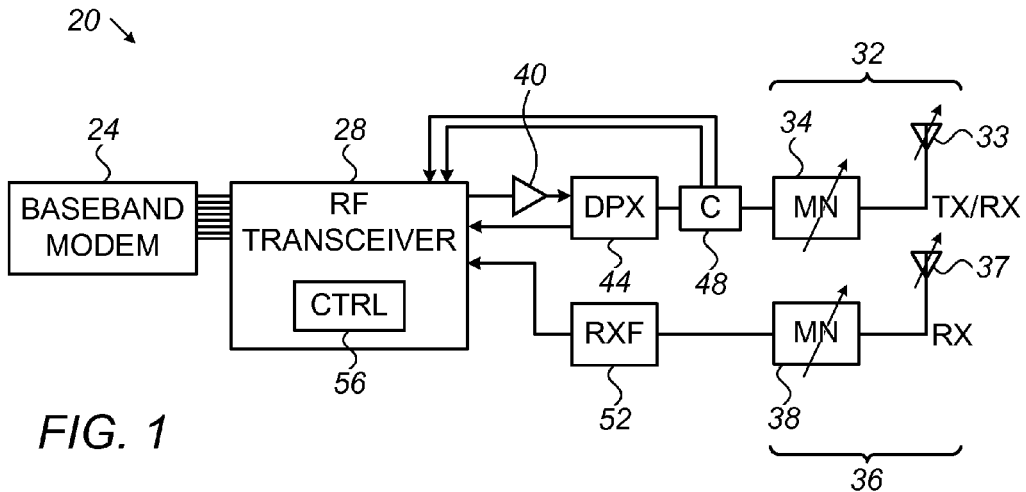
FIGS. 1-3 are block diagrams that schematically illustrate wireless communication devices with adaptively-tunable antennas, in accordance with embodiments of the present invention.

Embodiments of the present invention that are described herein provide improved wireless communication devices and associated communication methods. In the disclosed embodiments, a wireless communication device comprises one or more Electrically-Small Antennas (ESAs) used for transmission and/or reception. In the context of the present patent application and in the claims, the term "ESA" refers to an antenna whose volume is confined to a sphere of radius $\lambda/2\pi$, wherein $\lambda$ denotes the free-space wavelength of signals transmitted or received by the antenna.

ESAs are by nature narrowband, and their bandwidth typically decreases with physical size. For many wireless communication applications, the instantaneous bandwidth of an ESA (e.g., on the order of no more than 6% of the center frequency) is considerably narrower than the end-to-end bandwidth of the transmission and reception bands (sometimes on the order of 5-25% of the center frequency).

In order to use narrowband ESAs in broadband wireless communication applications, the wireless device's ESAs in the disclosed embodiments are adaptively tunable. In an embodiment, the device further comprises a control unit that adaptively tunes the frequency response of the ESA to the specific narrowband frequency slice that is actually used for signal transmission or reception. When using such an adaptively-tunable ESA, the instantaneous bandwidth of the ESA is only required to correspond to the instantaneous bandwidth of the transmitted or received signal (usually no more than 20 MHz).

In the context of the present patent application and in the claims, the term "adaptively-tunable antenna" refers to an antenna whose frequency response can be adjusted during device operation, as opposed to tuning during production. The antenna response can be tuned adaptively to match a desired frequency slice or sub-band of operation, possibly under varying conditions and circumstances. The tunable element or elements in an adaptively-tunable antenna may comprise or be coupled to the physical radiating elements of the antenna, and/or associated circuitry. The antenna may comprise any suitable tuning mechanisms, such as, for example, an aperture tuning mechanism, an impedance matching network, and/or a mechanism that adaptively connects or disconnects one or more antenna elements. The tuning scheme can be used for tuning to the desired frequency slice, as well as for compensating for various effects that degrade the antenna performance or shift the antenna oscillation frequency, such as body effects.

Various example configurations of wireless devices with adaptively-tunable ESAs are described herein. In one embodiment, the device comprises a transmit/receive (TX/RX) antenna and a receive-only (RX) antenna, both adaptively tunable. The RX antenna is tuned to the desired RX sub-band, and the TX/RX antenna is tuned to the desired TX sub-band. On reception, the device performs diversity reception with the RX-only antenna serving as the primary antenna and the TX/RX antenna serving as the diversity antenna. Since the TX/RX antenna is tuned to the TX sub-band, its gain and efficiency in the RX sub-band are degraded. This degradation, however, is tolerable when serving as a diversity antenna.

In another embodiment, the device comprise only a single adaptively-tunable ESA used for both transmission and reception. When using Frequency-Division Duplex (FDD), for example, this TX/RX antenna may be tuned so as to balance transmission and reception performance. Alternatively, e.g., when using Time-Division Duplex (TDD) or Half-Duplex Frequency Division Duplex (HFDD or HD-FDD), the control unit may tune the antenna alternately to the TX and RX sub-bands as needed.

Several additional device configurations are described herein. Various tuning schemes, and metrics that can be used by the control unit for tuning the ESAs, are also described.

The methods and devices described herein enable the use of physically small antennas in broadband wireless applications, with improved performance for a given antenna volume, or with smaller volume for a given performance level. The disclosed techniques can be applied in any suitable wireless devices, and are particularly attractive in small-size devices such as mobile phones and wearable devices such as smart watches and glasses.

System Description

FIG. 1 is a block diagram that schematically illustrates a wireless communication device 20, in accordance with an embodiment of the present invention. Device 20 may comprise, for example, a mobile phone, a smartphone, a smart wearable device such as smart watch or smart glasses, a device used in an Internet-of-Things (IoT) application, or any other suitable wireless device.

Device 20 may communicate over any suitable wireless network and in accordance with any suitable communication protocol or air interface. Example protocols comprise cellular protocols such as Wideband Code-Division Multiple Access (WCDMA), Long-Term Evolution (LTE) and LTE-Advanced (LTE-A), or Wireless Local-Area Network (WLAN) protocols such as the various IEEE 802.11 protocols. Alternatively, any other suitable protocol can be used. Device 20 may operate on any suitable transmission (TX) and reception (RX) bands, and using any suitable multiple access scheme, e.g., Frequency-Division Duplex (FDD), Time-Division Duplex (TDD) or Half-duplex FDD (HFDD).

In the present example, device 20 comprises a baseband modem 24 that carries out the baseband processing functions of the device, and a Radio Frequency (RF) transmitter-receiver (transceiver) 28 that performs RF transmission and reception. Device 20 comprises two ESAs—a TX/RX antenna 33 and a RX-only antenna 37. Antennas 33 and 37 may comprise any suitable type of ESA, such as, for example, Inverted-F Antenna (IFA), Planar Inverted-F Antenna (PIFA), meander line antenna, or any other suitable antenna type.

On transmission, baseband modem 24 generates a modulated baseband or low-Intermediate-Frequency (IF) signal in accordance with the applicable communication protocol. RF transceiver 28 up-converts the signal to RF, and outputs a TX signal in a certain frequency slice in the appropriate TX band. A Power Amplifier (PA) 40 amplifies the TX signal, and a duplexer 44 filters the amplified signal. The signal then passes through a directional coupler 48 that senses the forward and reverse power levels. Following the coupler, the signal passes through a tunable Matching Network (MN) 34, and finally transmitted via antenna 33.

On reception, an RX signal is received both by TX/RX antenna 33 and by RX antenna 37. In the reception chain of TX/RX antenna 33, the RX signal passes through MN 34 and coupler 48. The RX signal is then filtered by duplexer 44 and provided to RF transceiver 28. Transceiver 28 down-converts the RX signal, e.g, to baseband or to some Intermediate Frequency (IF), and provides the down-converted signal to modem 24 for further processing and decoding.

In the reception chain of RX antenna 37, the RX signal passes through a tunable MN 38, and is then filtered by a receive filter 52. The filtered signal is provided to RF transceiver 28, which down-converts it and provides the down-converted signal to modem 24 for processing and decoding.

In the embodiment of FIG. 1, RF transceiver 28 comprises a control unit 56 that performs various control and management functions. Among other tasks, control unit 56 tunes MNs 34 and 38, and also reads the forward and reverse power levels using coupler 48. These tasks are used in tuning the tunable TX/RX and RX-only antennas, as will be described in greater detail below. In the present context, antenna 33 and MN 34 are regarded jointly as an adaptively-tunable TX/RX antenna 32. Similarly, antenna 37 and MN 38 are regarded jointly as an adaptively-tunable RX antenna 36.

Figure 2:
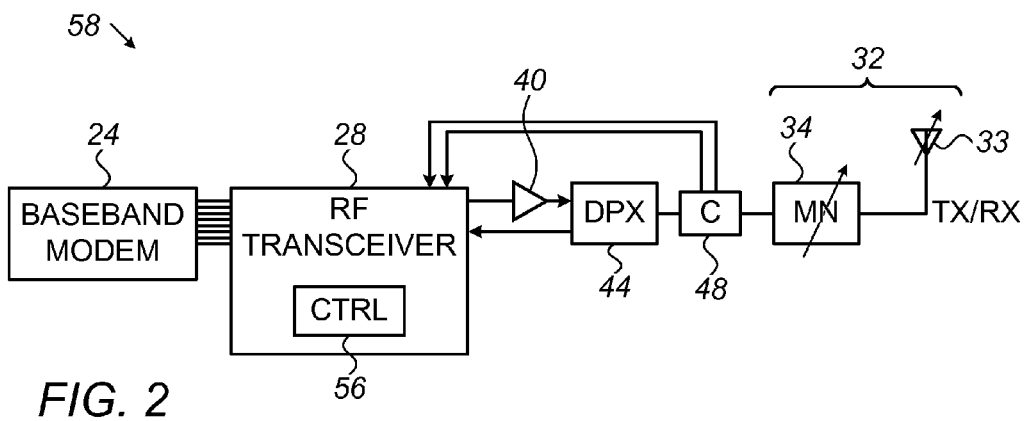

FIG. 2 is a block diagram that schematically illustrates a wireless communication device 58, in accordance with an alternative embodiment of the present invention. Unlike device 20 of FIG. 1, device 58 comprises only a single antenna—Adaptively tunable TX/RX ESA 32.

Figure 3:
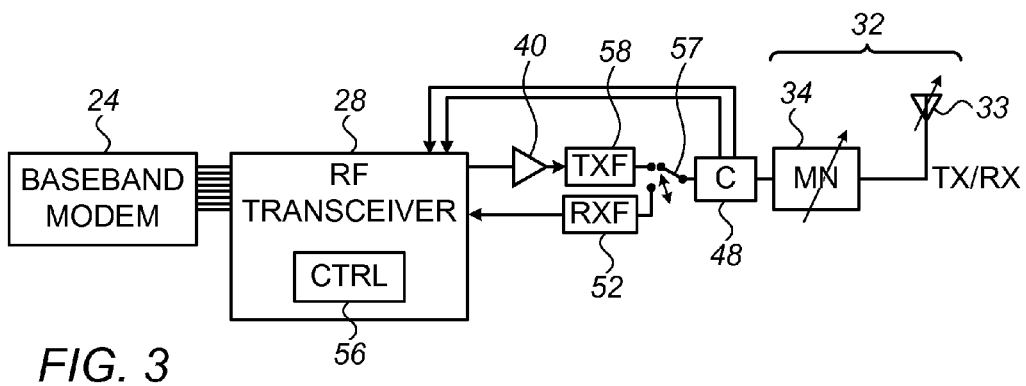

FIG. 3 is a block diagram that schematically illustrates a wireless communication device, in accordance with yet another embodiment of the present invention. This implementation is suitable, for example, for applications in which transmission and reception are not performed simultaneously, such as TDD and HFDD.

In the embodiment of FIG. 3, duplexer 44 is replaced by a Transmit-Receive (T-R) switch 57, and optional receive filter (RXF) 52 and transmit filter (TXF) 58. An additional optional filter (not shown in the figure) may be inserted between RF transceiver 28 and PA 40.

The configurations of the wireless devices shown in FIGS. 1-3, and their various elements, are example configurations that are chosen purely for the sake of conceptual clarity. In alternative embodiments, any other suitable configurations can be used. For example, the wireless device may comprise any other suitable number of TX/RX antennas and any other suitable number of RX-only antennas, one or more of which antennas being adaptively tunable. As another example, control unit 56 may be implemented in baseband modem 24 rather than in RF transceiver 28, or in any other suitable unit of the wireless device or its host system.

The different elements of the various wireless devices of FIGS. 1-3 may be implemented using suitable hardware, e.g., using one or more Application-Specific Integrated Circuits (ASICs), Field-Programmable Gate Arrays (FPGAs) and/or RF Integrated Circuits (ICs), using software, or using a combination of hardware and software elements.

In some embodiments, control unit 56 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Use of Adaptively-Tunable Electrically-Small Antennas

As explained above, Electrically-Small Antennas (ESAs) are characteristically narrowband, and this property limits their usability and achievable performance. Consider, for example, a typical FDD application in which transmission and reception are performed in respective different TX and RX bands separated by a guard band.

Figure 4A:
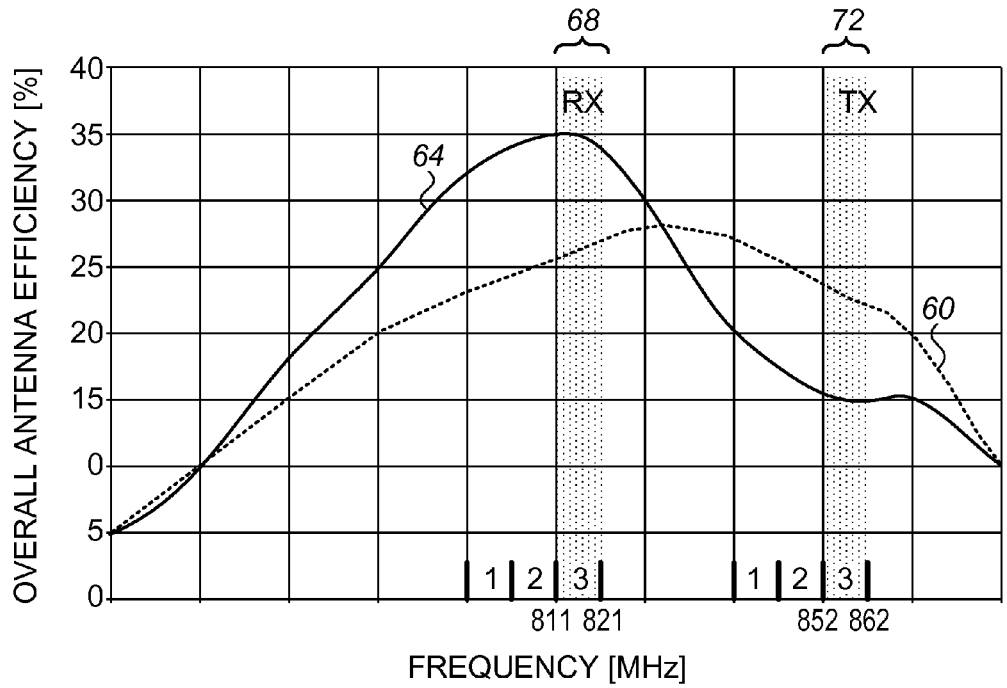
FIGS. 4A and 4B are graphs showing efficiencies of electrically-small antennas, in accordance with an embodiment of the present invention.
Figure 4B:
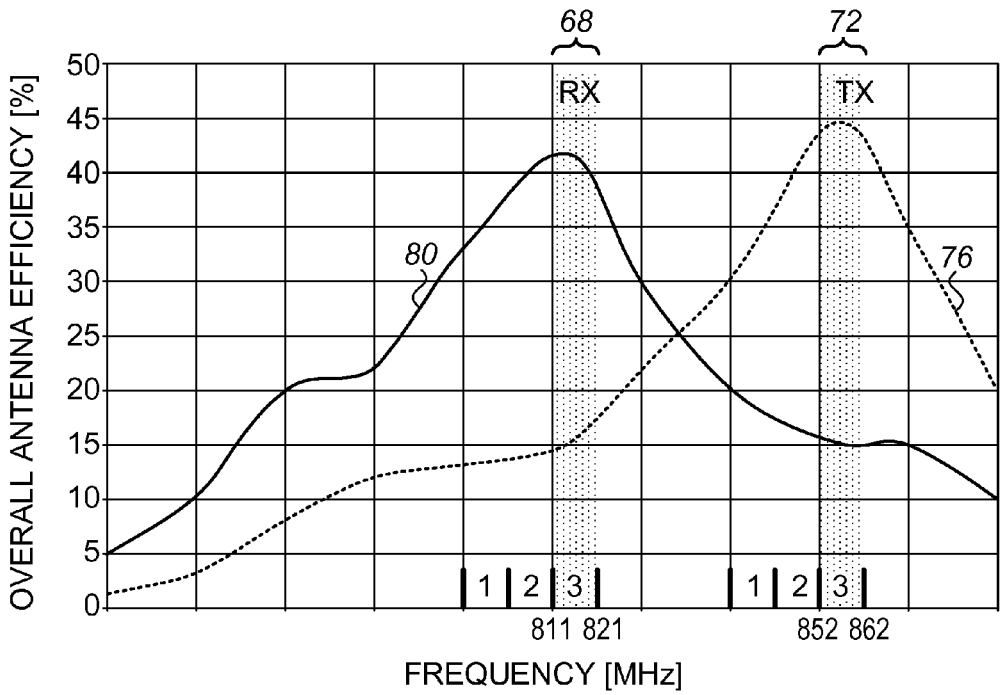

FIGS. 4A and 4B are graphs showing efficiencies of electrically-small antennas, in accordance with an embodiment of the present invention. FIG. 4A shows the performance of a possible conventional solution, whereas FIG. 4B shows the performance of adaptively-tunable ESAs and 36 of FIG. 1 above, in accordance with an embodiment of the present invention.

Both figures address an FDD application in which the RX band lies between 791-821 MHz, and the TX band lies between 832-862 MHz. The RX and TX bands are separated by an 11 MHz-wide guard band. Within these bands, the wireless device receives a 10 MHz-wide RX signal in an RX slice 68, and transmits a 10 MHz-wide TX signal in a TX slice 72. The RX band comprises three possible 10 MHz-wide receive slices marked "1", "2" and "3" in the figure, and the TX band comprises three corresponding 10 MHz-wide transmit slices marked "1", "2" and "3". In this example, the active channel is slice "3", which is shaded in the figure. The frequencies and bandwidths above are given purely by way of example, and any other frequencies and bandwidths can be used in alternative embodiments.

In the possible conventional solution of FIG. 4A, a dashed curve 60 shows the efficiency of a TX/RX antenna, and a solid curve 64 shows the efficiency of an RX antenna. The TX/RX antenna is tuned for maximal efficiency in the guard band (see curve 60), so that the instantaneous bandwidth of the antenna would cover the RX band and the TX band simultaneously. The RX antenna (see curve 64) is tuned so that its instantaneous bandwidth would cover the entire RX band. As can be seen in the figure, this tuning scheme comes at the expense of poor efficiency of both antennas in both bands.

In FIG. 4B, a dashed curve 76 shows the efficiency of adaptively-tunable TX/RX antenna 32, and a solid curve 80 shows the efficiency of adaptively-tunable RX antenna 36, in accordance with an embodiment of the present invention. Adaptively-tunable TX/RX antenna 32 is tuned for maximum efficiency over the actual 10 MHz-wide slice 72 used for transmitting the TX signal at this particular point in time, rather than over the entire 30 MHz-wide TX band or over both TX and RX bands. Adaptively-tunable RX antenna 36 is tuned for maximum efficiency over the actual 10 MHz-wide slice 68 used for receiving the RX signal at this particular point in time, rather than over the entire 30 MHz-wide RX band.

The improvement in performance achieved by the disclosed technique can be appreciated by comparing the corresponding efficiency curves in FIGS. 4A and 4B. In this particular example, TX/RX antenna 32 has an efficiency of ~40-45% in slice 72, as opposed to 22-25% in the conventional solution. RX antenna 36 has an efficiency of ~40-42% in slice 68, as opposed to 34-35% in the conventional solution.

It should be noted that the efficiency of TX/RX antenna 32 drops to ~15% in RX band 68, even though it is used for reception as well. In practice, however, when the device is configured to receive using multiple antennas, degraded reception performance can be tolerated in one of them.

For example, in some embodiments device 20 of FIG. 1 performs diversity reception, wherein RX antenna 36 serves as the primary or main antenna, and TX/RX antenna 32 serves as the diversity or secondary antenna. In such a configuration, the degraded efficiency of antenna 32 can be tolerated, as it serves as the secondary antenna. Baseband modem 24 is typically aware of which role is played by which antenna (antenna 36 serving as main, antenna 32 serving as secondary) and performs the various reception procedures accordingly. During device testing, when a single RX antenna is needed, device 20 selects antenna 36 as the single antenna.

In summary, by adaptively tuning antennas 32 and 36 to the actual TX and RX slices being used, it is possible to optimize the antennas for narrow bandwidth and thus high efficiency. In some embodiments, the instantaneous bandwidth of the adaptively-tunable ESA should match the instantaneous bandwidth of the signal (e.g., 20 MHz in a 20 MHz LTE system) rather than the bandwidth of the entire band.

In other embodiments, the adaptively-tunable ESAs may be generally narrowband, but not necessarily as narrowband as the signal. For example, in an FDD or HFDD application, any antenna bandwidth that is narrower than the applicable band (TX or RX) plus the guard band is considered narrowband. In a TDD application, any antenna bandwidth that is narrower than the applicable band (TX or RX) is considered narrowband.

In the context of the present disclosure, signal bandwidths and antenna bandwidths are typically measured as 3 dB-bandwidths. Alternatively, however, any other suitable convention can be used.

Example Antenna Tuning Schemes

In various embodiments, any suitable tuning scheme or circuitry may be used for adaptively tuning ESAs 32 and 36. Some tuning schemes, referred to as impedance matching or RF matching, aim to optimize the power transfer from the transmission line to the antenna by matching the antenna impedance to the impedance of the preceding RF circuitry.

In the examples of FIGS. 1 and 2, the antennas are tuned using RF Matching Networks (MNs) that are controlled by control unit 56. In an embodiment, control unit 56 adjusts the MNs in a closed-loop process that aims to minimize the Voltage Standing Wave Ratio (VSWR) of the antennas. Unit 56 may estimate the VSWR, for example, by assessing the ratio between the forward power level (power transmitted to the antenna) and reverse power level (power reflected from the antenna), as sensed by directional coupler 48.

In various embodiments, MNs 34 and 38 may be implemented using any suitable MN topology. In some cases it is possible to select the MN topology based on the specific type of antenna, knowledge regarding the antenna characteristics over frequency, and/or knowledge or assumptions regarding expected body effects. For example, it may be known that the antenna impedance is expected to vary only over a known range of impedances (e.g., over a specific region of the Smith chart). This knowledge can be used in the MN design for simplifying the MN, reduce losses and enable faster convergence and smaller look-up tables in control unit 56. In some embodiments the MN can be simplified to a single inductor-capacitor (LC), capacitor-capacitor (CC) or capacitor-inductor (CL) L-shaped MN, or to a T-shaped or Pi-shaped MN.

Other tuning schemes, sometimes referred to as aperture tuning, aim to optimize the radiation efficiency from the antenna terminals to free space. These tuning schemes typically modify the antenna aperture and/or resonance frequency. In some embodiments, aperture tuning may be implemented by coupling to the antenna a tunable element controlled by control unit 56. A tunable element may comprise, for example, a switched capacitor, a tunable capacitor (e.g., barium-strontium-titanate (BST) capacitor), or a Micro Electro-Mechanical System (MEMS) device. As yet another example, the tuning scheme may involve adaptively connecting and disconnecting one or more antenna elements. Further additionally or alternatively, any other suitable tuning scheme can be used.

In the description above, the adaptive tuning process of control unit 56 aims to optimize the antenna performance (e.g., efficiency) in the frequency slice of interest. In addition, control unit 56 may use the tuning process to compensate for various effects that distort the antenna performance, e.g., body effects due to proximity of the user body or other objects to the antenna.

In various embodiments, control unit 56 may tune one or more of the adaptively-tunable ESAs based on any suitable metric or combination of metrics. Example metrics comprise:

TX antenna VSWR measurement, as explained above
Properties of the RX signal such as, for example, Received Signal Strength Indication (RSSI) for each antenna, Reference-Signal Received Power (RSRP) for each antenna, correlation between RX antennas, reference signal phase difference, estimated noise/interference level in each RX antenna and/or RX signal Modulation and Coding Scheme (MCS).
Properties of the TX signal, such as, for example, TX signal power headroom.
Inputs from proximity detectors, indicative of nearby objects.
Inputs from bio sensors, e.g., heart rate, temperature, skin moisture, blood saturation and others. In a smart-watch application, for example, such sensors may enable control unit 56 to verify whether the wireless device is worn on the user body or lying on a table, and also to determine the position of the watch.
Inputs from motion sensors. In a smart-watch application, for example, such inputs may be indicative of whether the device is static, on which hand the device is worn and its orientation (e.g., front/back of the forearm).
Microphone/Speaker activity sensor. If the microphone and speaker are activated during a call, the device is likely to be held next to the user's head.
Charger connection sensor.

As noted above, in some embodiments control unit 56 may tune TX/RX ESA 32 while permitting a certain degradation in the ESA's reception performance in the RX band. In some embodiments, control unit 56 may set the amount of permissible degradation depending on one or more of the above metrics, or based on other suitable metrics. Control unit 56 may also use the above metrics, for example, to decide when tuning is needed, and in which direction to tune.

In an alternative embodiment, control unit 56 may tune TX/RX ESA 32 while balancing between TX and RX performance, based on one or more of the above metrics or other suitable metrics. This tuning scheme may be useful, for example, in device 58 (having a single antenna) operating in FDD.

Non-FDD Embodiments

The description above mainly addressed FDD applications. The disclosed techniques, however, are also applicable and advantageous in other duplex schemes, such as Time-Division Duplex (TDD) and Half-duplex FDD (HFDD). In a TDD application, for example, transmission and reception are performed on the same frequency, in alternating time periods. In such a protocol, a single TX/RX antenna can be used, such as in device 58 of FIG. 2. Control unit 56 may adaptively tune TX/RX ESA 32 to the applicable TX/RX frequency. As another example, a TDD device may use two antennas as in device 20. In this embodiment, both antennas may be narrowband and tuned by control unit 56 using similar criteria.

In HFDD, transmission and reception are performed on different frequencies, but in alternating time periods and not simultaneously. The techniques described above with reference to FDD can be used in FDD, as well. In some embodiments, control unit 56 may adaptively tune ESA 32 depending on whether the device currently transmits or receives. In other words, the control unit may switch the ESA to a TX-optimized tuning scheme during transmission, and to an RX-optimized tuning scheme during reception. Typically, the TX-optimized scheme tunes the center frequency of the antenna to a suitable frequency in the TX band, and the RX-optimized scheme tunes the center frequency of the antenna to a suitable frequency in the RX band.

In another embodiment, an HFDD device may use two antennas as in device 20. In this embodiment, control unit 56 may alternate TX/RX ESA 32 between a TX-optimized tuning scheme during transmission, and an RX-optimized tuning scheme during reception. The center frequency of RX-only ESA 36, on the other hand, may be retained constant in the RX band.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A communication device, comprising:
a transmitter (TX), which is configured to produce a TX signal for transmission on a TX frequency band;
a receiver (RX), which is configured to process an RX signal received on an RX frequency band that is different from the TX frequency band;
an adaptively-tunable Transmit/Receive (TX/RX) Electrically-Small Antenna (ESA), configured to transmit the TX signal on the TX frequency band and to receive the RX signal on the RX frequency band;
an adaptively-tunable Receive-only (RX) ESA, configured to receive the RX signal on the RX frequency band; and
a control unit, which is configured to:
adaptively tune a narrowband response of the TX/RX ESA to the TX frequency band, both while transmitting on the TX band and while receiving on the RX band, such that the TX/RX ESA has degraded reception performance relative to the RX ESA in the RX band; and while receiving on the RX band, to apply diversity reception to the RX signal received by the TX/RX ESA and the RX-only ESA, and to reduce an impact of the degraded reception performance of the TX/RX ESA by assigning the RX ESA to serve as a primary antenna and assigning the TX/RX ESA to serve as a secondary antenna.

2. The device according to claim 1, wherein at least one of the adaptively-tunable ESAs has an instantaneous bandwidth that corresponds to the instantaneous bandwidth of the RX or TX signal.

3. The device according to claim 1, wherein the control unit is configured to tune at least one of the adaptively-tunable ESAs to match an actual frequency of the RX or TX signal.

4. The device according to claim 1, wherein the control unit is configured to tune the adaptively-tunable TX/RX ESA so as to balance a performance of the adaptively-tunable TX/RX ESA over the RX and TX bands.

5. The device according to claim 1, wherein at least one of the adaptively-tunable ESAs comprises an impedance matching network, and wherein the control unit is configured to adaptively tune the one of the adaptively-tunable ESAs by adjusting the impedance matching network.

6. The device according to claim 1, wherein at least one of the adaptively-tunable ESAs comprises an aperture-tuning element, and wherein the control unit is configured to adaptively tune the one of the adaptively-tunable ESAs by adjusting the aperture-tuning element.

7. The device according to claim 1, wherein the control unit is configured to adaptively tune at least one of the adaptively-tunable ESAs by adaptively connecting or disconnecting one or more elements of the one of the adaptively-tunable ESAs.

8. The device according to claim 1, wherein the control unit is configured to adaptively tune at least one of the adaptively-tunable ESAs based on at least one metric selected from a group of metrics consisting of:
a Voltage Standing Wave Ratio (VSWR) of the one of the adaptively-tunable ESAs;
a property of the RX signal;
a property of the TX signal; and
an indication from a detector or sensor in the device.

9. The device according to claim 1, wherein the TX and RX are configured to transmit the TX signals and receive the RX signals using Frequency-Division Duplex (FDD) or Half-duplex FDD (HFDD).

10. A method for communication, comprising:
transmitting a transmit (TX) signal on a TX frequency band via an adaptively-tunable Transmit/Receive (TX/RX) Electrically-Small Antenna (ESA), and receiving a receive (RX) signal on an RX frequency band, different from the TX frequency band, via the adaptively-tunable TX/RX ESA and via an adaptively-tunable Receive-only (RX) ESA;
adaptively tuning a narrowband response of the TX/RX ESA to the TX frequency band, both while transmitting on the TX band and while receiving on the RX band, such that the TX/RX ESA has degraded reception performance relative to the RX ESA in the RX band; and
while receiving on the RX band, applying diversity reception to the RX signal received by the TX/RX ESA and the RX-only ESA, and reducing an impact of the degraded reception performance of the TX/RX ESA by assigning the RX ESA to serve as a primary antenna and assigning the TX/RX ESA to serve as a secondary antenna.

11. The method according to claim 10, wherein at least one of the adaptively-tunable ESAs has an instantaneous bandwidth that corresponds to the instantaneous bandwidth of the RX or TX signal.

12. The method according to claim 10, and comprising tuning at least one of the adaptively-tunable ESAs to match an actual frequency of the RX or TX signal.

13. The method according to claim 10, wherein adaptively tuning the response comprises tuning the adaptively-tunable TX/RX ESA so as to balance a performance of the adaptively-tunable TX/RX ESA over the RX and TX bands.

14. The method according to claim 10, wherein adaptively tuning the response comprises adjusting an impedance matching network of at least one of the adaptively-tunable ESAs.

15. The method according to claim 10, wherein adaptively tuning the response comprises adjusting an aperture-tuning element of at least one of the adaptively-tunable ESAs.

16. The method according to claim 10, wherein adaptively tuning the response comprises connecting or disconnecting one or more elements of at least one of the adaptively-tunable ESAs.

17. The method according to claim 10, wherein adaptively tuning the response comprises tuning at least one of the adaptively-tunable ESAs based on at least one metric selected from a group of metrics consisting of:

a Voltage Standing Wave Ratio (VSWR) of the one of the adaptively-tunable ESAs;

a property of the RX signal;

a property of the TX signal; and an indication from a detector or sensor.

18. The method according to claim 10, wherein transmitting the TX signals and receiving the RX signals comprises applying Frequency-Division Duplex (FDD) or Half-duplex FDD (HFDD).

* * * * *